March 12, 1957   F. T. NEWELL ET AL   2,784,991
COUPLING WITH STRESS PREVENTING GASKET
Filed Sept. 24, 1953   5 Sheets-Sheet 4

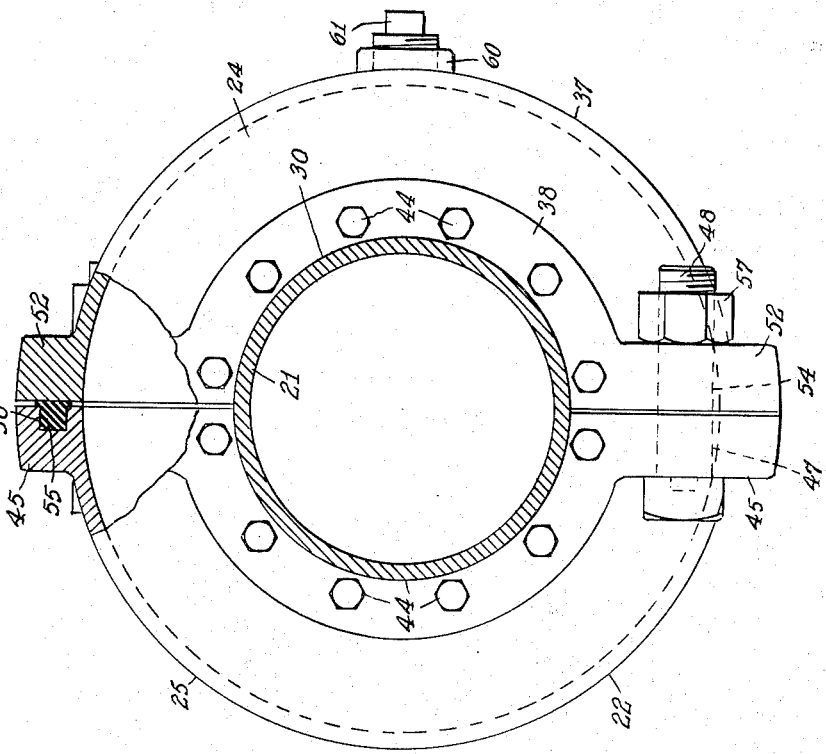
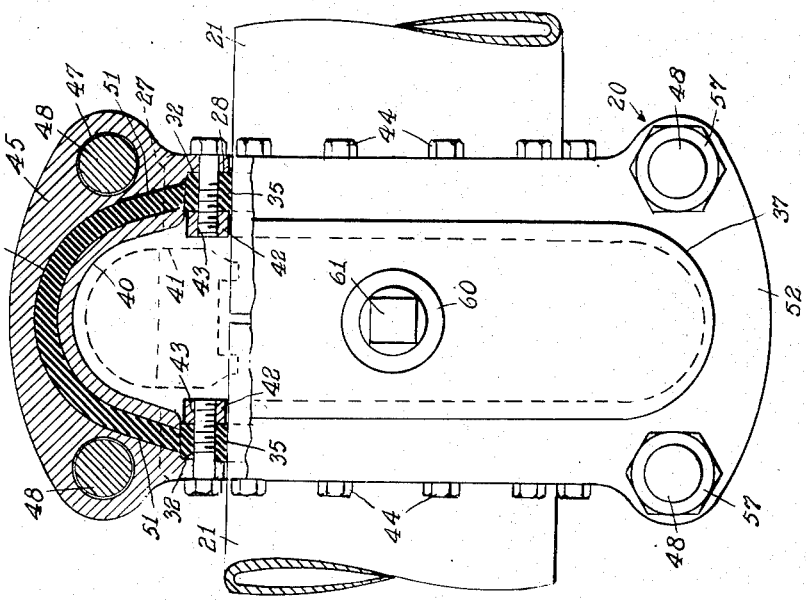

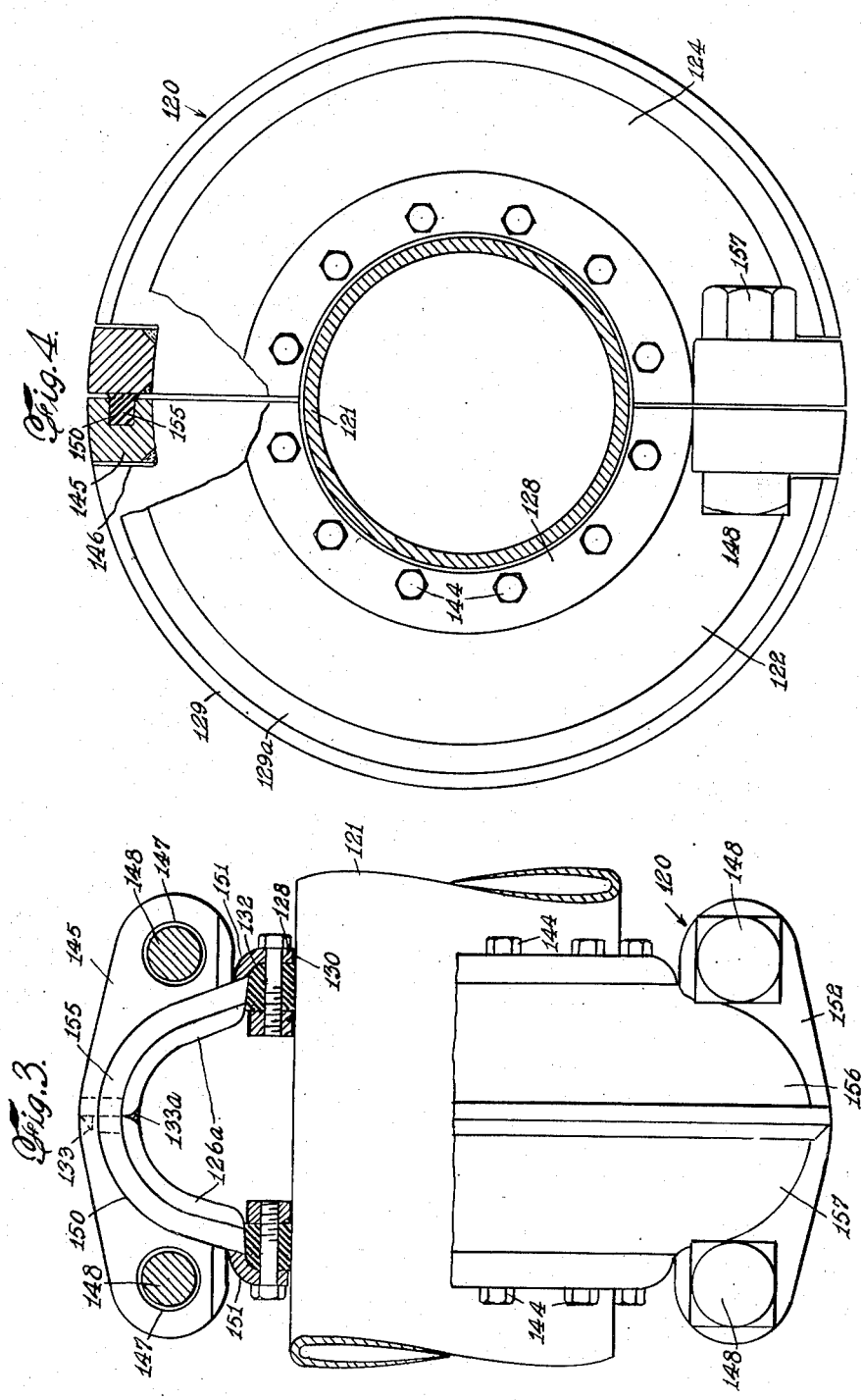

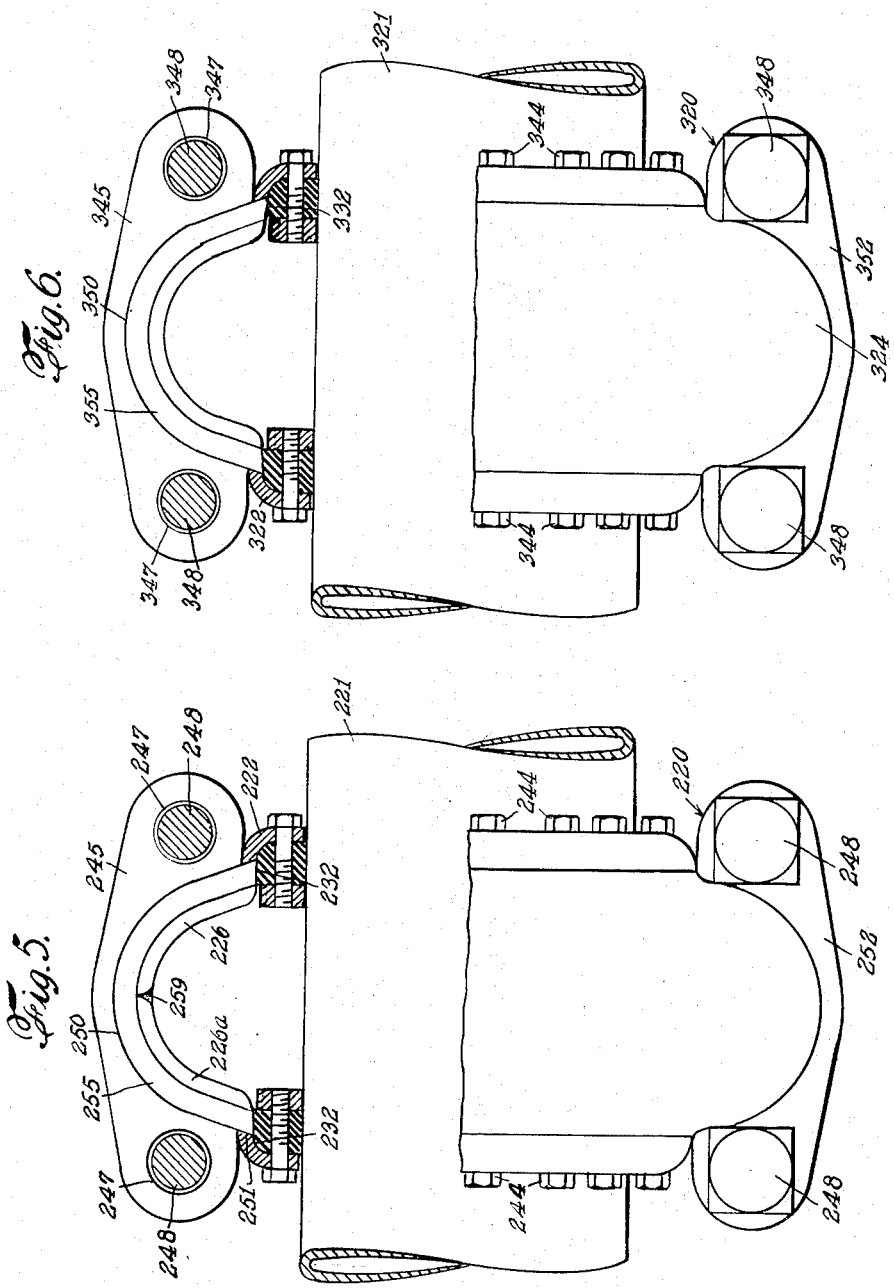

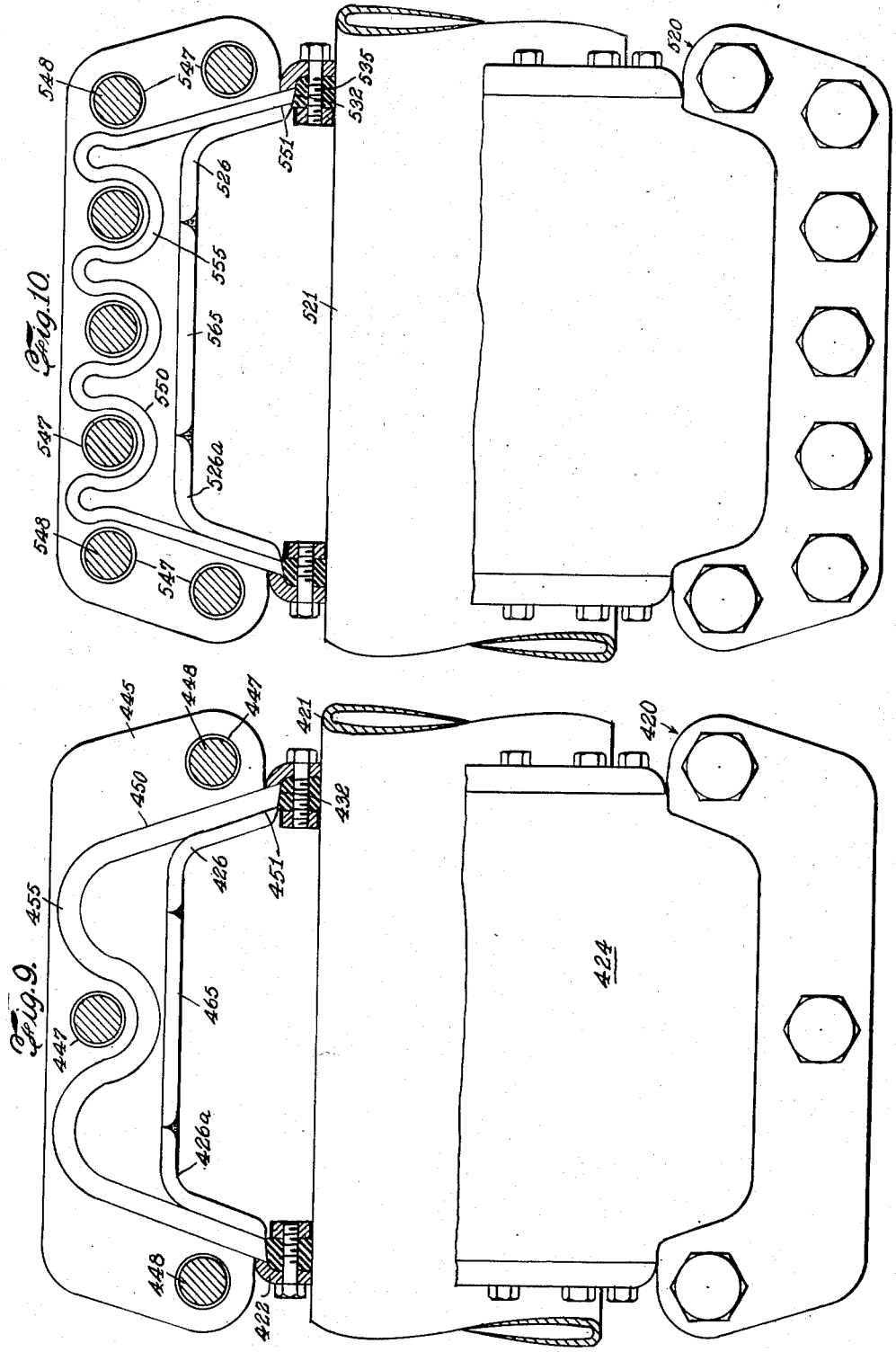

United States Patent Office 2,784,991
Patented Mar. 12, 1957

2,784,991
COUPLING WITH STRESS PREVENTING GASKET

Frederick T. Newell and Roger E. Risley, Bradford, Pa., assignors to Dresser Industries, Inc., Dallas, Tex., a corporation of Pennsylvania Application September 24, 1953, Serial No. 382,124

4 Claims. (Cl. 285—373)

This invention relates to couplings and repair sleeves for pipe lines and is more particularly concerned with a split repair sleeve constructed to prevent uneven stresses to be exerted upon the sleeve when it is applied to the pipe line.

Steel and iron pipe lines used for the transmission of oil, gas, water and like fluids, both above and below ground, occassionally develop leaks at the joint between adjacent sections of pipe, or breaks or cracks occur in the body of the pipe sections themselves. Whenever possible, these leaks, breaks and cracks are repaired without taking the pipe line apart to replace the damaged portion, since costly interruptions in service are thus avoided. For this purpose, there has been developed the so-called split repair sleeve which is adapted to be clamped around the portion of the pipe line to be repaired to provide a flexible, fluid-tight enclosure around the damaged or faulty section of the line. Split repair sleeves used commercially for this purpose are generally made from cast or wrought metal and commonly comprise two semi-cylindrical segments provided with longitudinal flanges which are adapted to receive bolts for drawing together the sleeve segments upon suitable packing material to seal the longitudinal joint. The ends of the segments are brought into fluid-tight engagement with the outer surface of the pipe upon which the sleeve is installed by means of suitable gaskets which are compressed radially against the pipe by means of clamping rings or followers. When split repair sleeves of this character are installed, both the ends and the longitudinal edges of the sleeve sections are subjected to substantial bending stresses when the bolts are tightened to compress the end gaskets and to effect a fluid-tight seal along the longitudinal joint between the sleeve sections. These bending stresses are of particular importance and create particularly serious problems when the sleeve is to be installed upon a pipe which carries fluid under high pressure, such as high pressure gas. Considerable tightening of the bolts is necessary to compress the gaskets and the longitudinal seals sufficiently to resist the pressure of the gas or other high pressure fluid in the line, and this tightening of the bolts frequently causes distortion of the sleeves. This distortion sometimes prevents a fluid-tight installation from being satisfactorily obtained. Thus, when the opposed side flanges are drawn together by the bolts they tend to pivot about the longitudinal seal as a fulcrum and thus cause the sides of the sleeves to be pulled away from the pipe. This has an adverse effect upon the fluid-tightness of the end gaskets, and when this type of distortion is excessive, satisfactory fluid-tightness of the end gaskets can ordinarily not be obtained. The pressures exerted by the bolts at the ends of the sleeves and along the longitudinal edges of the sleeve are not balanced in ordinarily-used split repair sleeves, and satisfactory installation of conventional split repair sleeves on high pressure lines is thus frequently very difficult to obtain and requires highly skilled labor.

It is the principal object of the present invention to provide a split repair sleeve of improved construction adapted for installation on pipe lines without distortion.

It is another object of the invention to provide a split repair sleeve of the character indicated which is constructed in such manner that the stresses exerted upon the longitudinal edges of the sleeve are effectively balanced.

It is a further object of the invention to provide a split repair sleeve particularly suitable for use on pipe lines carrying high pressure fluids.

It is another object of the invention to provide a split repair sleeve of the character indicated which has a sealing arrangement which effectively balances the bending forces exerted upon the sleeve sections during installation.

In accordance with the invention there is provided a split repair sleeve comprising two complementary arcuate members having end sealing means and having cooperating radially extending longitudinal flanges constructed to be drawn together by bolts when the repair sleeve is installed upon a pipe line and being adapted to receive and be engaged by longitudinal resilient sealing elements which extend sinuously along both radial sides of the bolts. It is a feature of the invention that the resilient longitudinal sealing elements not only balance the uneven stresses imposed by the bolts along the flanges but also eliminate the effect of the forces exerted by the followers in compressing the gaskets at the ends of the sleeve.

Other objects and features of the invention will be apparent from the following detailed description and from the drawings, wherein;

Fig. 1 is a plan view, partly in section to show details of construction, of a split repair sleeve embodying features of the present invention;

Fig. 2 is an end elevational view, also partly in section, of the repair sleeve shown in Fig. 1;

Fig. 3 is a plan view, partly in section as in Fig. 1, of another embodiment of the invention;

Fig. 4 is an end elevation, partly in section, of the split sleeve shown in Fig. 3;

Fig. 5 is a partly sectioned plan view of a further embodiment of the invention showing a variation in the structure of the body portion of the sleeve.

Fig. 6 is a similar view of a further modified form of split sleeve embodying features of the invention;

Fig. 9 is a sectioned plan view of a further embodiment of the invention, illustrating a side packing recess of modified form; and Fig. 10 is a similar view of another embodiment with a side packing recess of still further modified form.

Figure 8:
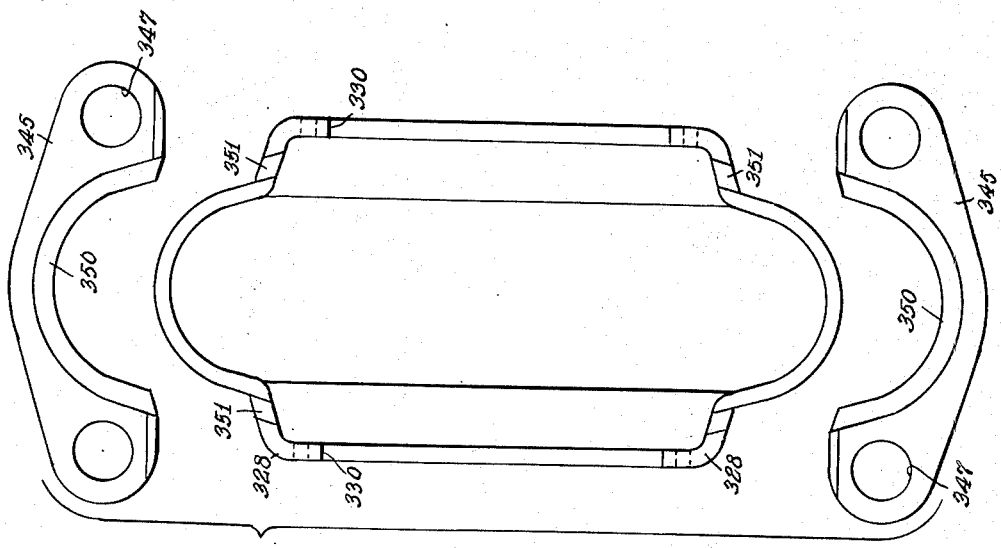
Fig. 8 is a plan view of portions of the sleeve of Figs. 6 and 7 showing the relationship of parts and illustrating the method of assembly.

Referring to the drawings, and more particularly to Figs. 1 and 2, the reference numeral 20 designates generally a split repair sleeve constructed in accordance with the invention. The sleeve 20, which is shown in position on a pipe 21, is formed from two semi-cylindrical segments 22 and 24 having complementary edges which cooperate to form a radial juncture between the two segments. The lower segment 22, which is suitably formed by casting or other convenient metal-shaping operation, comprises a radially-bulged semi-circular central portion 25 with end flange portions having an axial body 27 and a radial flange 28 shaped to define one half of the pipe apertures 30 in which the pipe 21 is received. The flange portions of the segment 22 define semi-circular gasket recesses 32 at each end of the segment in which are received packing members or gaskets 35 for sealing the sleeve against escape of fluid at the juncture between the sleeve 20 and the pipe 21. The upper segment 24 is similarly formed with a central portion 37 and end flange portions having radial flanges 38 defining the other half of the pipe apertures 30 and gasket recesses 32. The sleeve segments 22 and 24 thus define an interior chamber 40 of sufficient size to enclose a pipe coupling, indicated at 41, by which two adjacent sections of the pipe 21 are connected, in the event the portion of the pipe line to be enclosed by the repair sleeve 20 is at or adjacent the coupling. The particular dimensions of the chamber 40, however, do not affect the construction of sleeve 20 insofar as its relation to the present invention is concerned. Gaskets 35, which are adapted to be received in the gasket recesses 32 defined by both the sleeve segment 22 and the segment 24, are advantageously semi-circular in form with abutting or overlapping ends. The gaskets are formed from elastomer material, this term being used generically to include natural or synthetic rubbers, and other elastomeric compounds, or compositions having like properties and characteristics, and is sufficiently resilient and yielding to provide a fluid-tight seal when pressed into engagement with the pipe 21 and the adjacent portions of the sleeve 20. The ends of the gaskets, whether abutting or overlapping, also are pressed into fluid-tight relationship.

The gaskets 35 are pressed into the desired sealing relationship with the pipe and the sleeve by means of clamping rings or followers 42 which are suitably formed in two sections with abutting ends. Each follower is provided with a series of threaded apertures 43 which are adapted to register with bolt holes in the flanges 28 and 38 communicating with gasket recesses 32. To press the gaskets 35 and expand them radially into sealing engagement with adjacent surfaces, followers 42 are drawn toward the flanges 28 and 38 by means of bolts 44 which extend through the apertures in the flanges and threadedly engage the followers.

In accordance with the invention, the longitudinal edges of the sleeve 20 are joined and sealed in fluid-tight relationship by means which balance any stresses which tend to distort the sleeve and thereby prevent effective action of the longitudinal seals or of the end seals. For this purpose, the longitudinal edges of the sleeve segments 22 and 24 are formed with complementary radial flanges adapted to be drawn together by bolts or the like and carrying a side packing which is arranged relatively to the bolts in a manner which makes possible the desired stress-compensating action. Referring to Figs. 1 and 2, for example, the lower sleeve segment 22 is formed at its side edges with radially-extending flanges or "sidebars" 45 which merge with the body of the sleeve segment at its central portion and at its flange portions. The side bars 45 have ear portions at their ends which are formed with bolt apertures 47 for reception of the bolts 48. Each of the side bars 45 is formed with an arcuate groove 50 which follows the curvature of the central body portion 25 of the sleeve and merges with corresponding grooves 51 formed in the axial body 27 of the end flange portions of the sleeve so as to provide a continuous groove extending from the gasket recess 32 at one end of the sleeve to the corresponding recess at the other sleeve end. It will be seen in Fig. 1 that each groove 50 extends from points radially inwardly of the bolts 48 to points radially outwardly of the bolts and thus crosses a straight line passing through the centers of the bolts. The grooves 50 may be of any convenient form longitudinally and, in the embodiment shown in Figs. 1 and 2, they will naturally follow to a certain extent the configuration of the chamber 40. The grooves 50 are preferably of substantially uniform width throughout their length and throughout their depth and are preferably of rectangular shape, although this is not essential. The short grooves 51 are similarly formed so that they provide complementary continuations of the main grooves 50. The sleeve segment 24 is formed with corresponding side bars 52 similar in shape to the side bars 45 and provided with bolt apertures 54 which register with the bolt apertures 47 when the segments 22 and 24 are placed together around the pipe. The side bars 52 of the sleeve segment 24, however, are not grooved and present a planar surface.

The grooves 50 and 51 are adapted to receive a longitudinal side packing 55 of a width substantially equal to that of the grooves and of a thickness somewhat greater than the depth of these grooves so that when the side packing 55 is inserted in the grooves, a considerable portion of it will extend upwardly above the face of the side bars 45. Thus, when the two sleeve segments are drawn together by the action of bolts 48, the side packing 55 will be displaced laterally between the opposed faces of the side bars 45 and 52, as seen in Fig. 2, to provide a secure, fluid-tight seal between these members. It will also be seen that the side packing 55 merges with the gaskets 35 in the gasket recesses at the ends of the sleeve so that there is a continuous seal for the chamber 40. The side packing strips 55 are suitably formed from the same material used in making the gaskets 35 which, are previously mentioned, is relatively firm and solid but is sufficiently resilient and elastic to flow under pressure to conform to the surfaces between which it is confined.

As will be apparent by reference to Fig. 2, that, when the bolts 48 are tightened upon the side bars by means of the nuts 57, there will be a bending stress imposed upon the walls of the sleeve segments which will tend to distort the segments. Were there nothing to compensate or check these bending stresses, damage to the sleeve would result and not only would it be exceedingly difficult to effect a satisfactory seal without the application of very high compressing forces but the central portions of the sleeve segments might be depressed to such an extent that the seal formed by the end gaskets would be broken. The construction of the invention, however, checks and eliminates these bending stresses and makes possible a uniform effective application of fluid-tight sealing pressure in all parts of the sleeve. This compensating action is brought about by the portion of the side packings 55 which lie radially outwardly of the bolts. These portions of the packings serve to distribute and equalize the forces exerted by the bolts when the sleeve segments are drawn together.

The forces acting on the sleeve as a whole may be conveniently designated by the formula $S+E=C$, wherein S is the force exerted on the portions of the side packs which lie radially inwardly of the bolts, E is the force exerted on the end packs or gaskets, and C is the compensating force set into operation by the portions of the side packs which lie radially beyond the bolts. While the side packings 55 may be of uniform composition throughout their length they may also be of varied composition with the portions lying radially beyond the bolts being generally less resilient than the remainder. The resiliency or compressive resistance of the materials is conveniently expressed in terms of durometer values and in accordance with the invention, the side packings are formed from rubbery materials having durometer values lying between 50 and 85. In the embodiment of Figs. 1 and 2, the side packings are formed from a material having a durometer value lying within the above range but the portion of the packings lying radially outwardly of the bolts advantageously has a compressive resistance which is 10 to 50% greater than the compressive resistance of the remainder of the packings. Instead of a continuous strip formed from materials of varying durometer values, the side packings may be formed from separate portions of different durometer values with abutting or overlapping ends.

It will be apparent that various modifications may be made in the embodiment illustrated in Figs. 1 and 2 without departing from the scope of the invention. Some modified embodiments are given by way of example in Figs. 3 to 10.

Referring more particularly to Figs. 3 and 4, wherein parts corresponding to those shown in the embodiment of Figs. 1 and 2 have been used to which 100 has been added, there is shown a split repair sleeve 120 formed from complementary segments 122 and 124. Instead of being integrally formed as a casting, each segment is formed from two semi-circular portions. Thus the segment 122 is formed from body members 126 and 126a which have interengaging outer radial flanges 129 and 129a, respectively, and are secured to each other by welds 133 and 133a. As shown in Fig. 3, body member 126 curves axially outwardly adjacent pipe 121 to define gasket recess 132 and has a radially inwardly-directed inner flange portion 128 which defines part of the pipe aperture 130. Body member 126a is similarly formed. The edges of sleeve segment 122 are provided with side bars 145 which are welded to the outer surface of the segment 122, the outer radial flanges 129 and 129a being cut away, as shown at 146, to receive the side bars. Side bars 145 have ear portions provided with bolt apertures 147 for receiving the bolts 148 and are formed with a side packing groove 150 merging with grooves 151 for reception of the side packing 155. The sleeve segment 124 is in like manner formed from two semi-circular body members 156 and 157 welded together along their radial edges and provided with side bars 152 of the size and shape of the side bars 145. The sleeve 120 is suitably formed in the manner described in our copending application Serial No. 298,296, filed July 11, 1952, wherein two washer-shaped malleable metal blanks are stamped in dies to the desired shape and are then welded together along their peripheries to provide the form shown in Fig. 4, and after attachment of the side bars, the sleeve is cut axially along the plane passing between the adjacent side bars to provide the two sleeve segments 122 and 124.

While the peripheral rib provided by the outer radial flanges 129 and 129a is of utility as a reinforcing member to impart increased strength to the sleeve, it may be eliminated if desired. In Fig. 5 is shown a split repair sleeve constructed in accordance with the invention which is substantially identical with the sleeve 120 shown in Figs. 3 and 4 but which differs from that embodiment in having no radially-extending flange at the line of juncture of the body members of the sleeve. As shown in Fig. 5, the sleeve 220 has a lower segment 222 formed from body members 226 and 226a which have tapered end edges. These tapered end edges define a weld fillet in which is deposited the weld 259. Sleeve 220 is suitably formed by the method disclosed in our above-mentioned copending application, the washer-shaped metal blanks which are employed being of somewhat lesser diameter than those used to form the sleeve 120 so that their edges do not extend beyond the top of the pattern in the die in which they are stamped and consequently the radial flange portions are not formed. As in the embodiments previously described, however, the side bars 245 have ear portions provided with bolt apertures 247 and are formed with a side packing groove 250 which cooperates with grooves 251 to provide a channel to receive side packing 255 which extends from one gasket recess 232 to the other and extends radially outwardly beyond the bolts 248.

Figure 7:
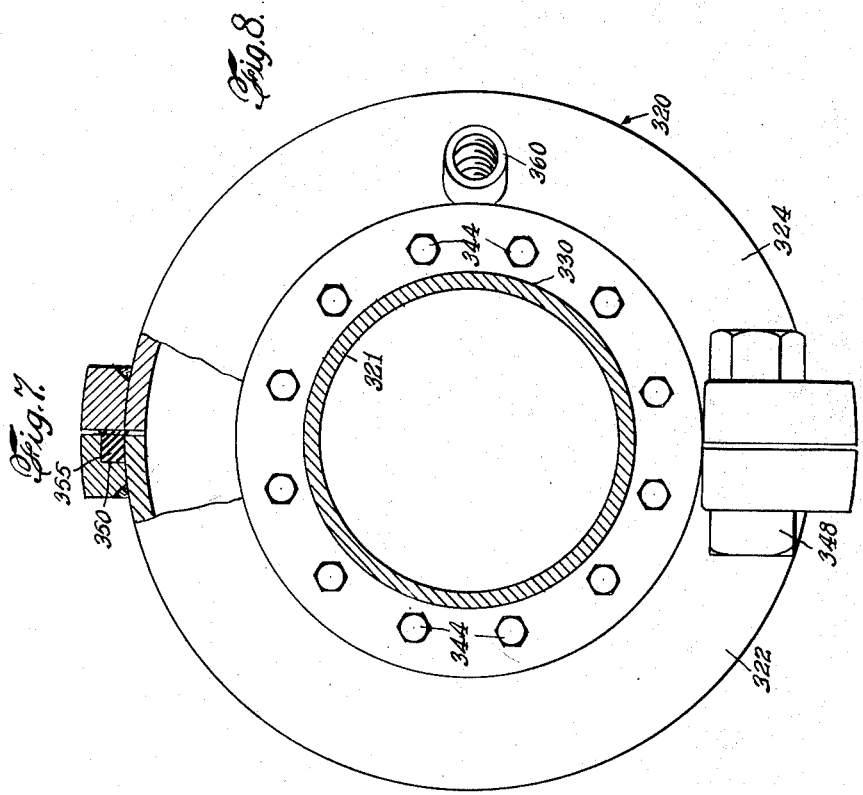
Fig. 7 is an end elevation, partly in section, of the sleeve construction shown in Fig. 6.

Other methods may be employed to manufacture a split sleeve embodying features of the invention. As shown in Figs. 6, 7 and 8, a sleeve 320 is formed from two sleeve segments 322 and 324 which comprise side bars 345 and a body portion defining the gasket recesses 332. The body portion is readily formed by deep drawing a malleable metal blank which is then suitably cut to the form shown in Fig. 8. Thus, when the drawn blank is removed from the die it is trimmed to the extent necessary to give it the desired outline; more particularly, semi-circular segments are cut out of its end walls to define the pipe apertures 330 and bolt apertures are bored in the flange portions 328 for reception of the follower bolts 344. The grooves 351 are then cut in the edges of the body portion. Finally there are welded to the edges of the body portion the side bars 345 which are separately formed, as by casting, and are provided with bolt apertures 347 and are recessed along their inner edges to define the side packing grooves 350 which, when the parts are welded together, merge with the grooves 351. It will be seen that the side packing grooves 350 extend radially outwardly beyond the bolt apertures 347 so that portions of the packing 355 lie on both radial sides of every bolt. The complementary segment 324 is similarly formed except that it is not necessary to provide the grooves 350 and 351. The segment 324 is suitably provided with an outlet 360 like the outlet 60 of Fig. 1, conveniently closed by a plug (not shown) such as shown at 61 in Fig. 1. The above-mentioned method of making the split sleeve is described in detail and claimed in our co-pending application Serial No. 301,466, filed July 29, 1952.

It will be apparent that various changes and modifications may be made in the arrangement of the side packing shown in the above-described embodiments while still retaining the advantages and features of the invention. For example, the side bars may be provided with more than two bolts and the sinuous path of the side packings and their associated grooves may be varied. In Figs. 9 and 10 there are shown, merely by way of illustration, two such embodiments of the invention. Referring more particularly to Fig. 9, the split sleeve 420 is formed from sleeve segments 422 and 424 which are similar to the segment 222 and the associated segment of Fig. 5, except that the body members 426 and 426a, instead of being directly welded to one another along their radial juncture line, are spaced apart by a cylindrical spacing member 465 to give the sleeve a substantially greater axial length. The side bars 445 are similarly of increased axial dimension and are provided with three bolt apertures 447 for receiving the bolts 448, and the side packing groove 450 follows a sinuous path which carries it on both radial sides of each bolt, even the outermost one. Groove 450 communicates and merges with grooves 451 formed in the edges of body members 426 and 426a, which in turn communicate with gasket recesses 432. Thus, when the side packing 455 is seated in this groove it will lie radially inwardly and radially outwardly of each bolt and of any straight lines joining adjacent bolts, with the result that upon drawing the segments together by tightening the bolts 448 any bending stresses imposed by these bolts will be effectively compensated and checked, and a uniform sealing action will result without distortion of any part of the sleeve.

In some cases, particularly where relatively high pressures will be encountered in the pipe line upon which the sleeve is to be installed, it is desirable to provide a greater number of bolts. A split sleeve which is of generally the same size as the sleeve 420 shown in Fig. 9 but which is constructed to accommodate seven side bar bolts on each side is shown by way of example in Fig. 10. Sleeve 520 is formed from body members 526 and 526a which are joined to each end of a cylindrical spacing member 565. The body members define gasket recesses 532 and are formed with grooves 551 adapted to bring the side packing 555 into engagement with the end gaskets 535. Each side bar 545 is provided with seven apertures 547, two being positioned at the radially inner portions of the side bar and the five others being axially aligned in the main body of the side bar. The side packing groove 550, as in the embodiment of Fig. 8, follows a sinuous path which has portions lying on both radial sides of every bolt aperture and brings the side packing closely adjacent each aperture as well. In this construction, as in those previously described, the side packing 555 functions both as a sealing medium and as a torque compensating and nullifying means which prevents the imposition of bending stresses on the sleeve and insures the uniform, even application of sealing pressure when the side bars are drawn together by the bolts 548.

It will be understood that the sleeves 420 and 520 shown in Figs. 9 and 10, respectively, are not necessarily formed by the welded construction of the embodiment of Fig. 5 but may be formed as a casting or they may be formed by the deep drawing method described in connection with the embodiment of Figs. 6 to 8. It will also be understood that varying numbers of bolt apertures may be formed in the side bars and that the sinuous path of the side packing grooves may vary from the forms specifically disclosed.

While the invention has thus been illustrated and described with particular reference to certain preferred embodiments, it will be obvious that various changes and modifications in addition to those above mentioned may be made without departing from the scope of the invention as defined in the appended claims. It will be further understood that, insofar as they are not mutually incompatible, the various features and details of construction of the several embodiments shown and described are interchangeable with one another. It is intended, therefore, that all matter contained in the foregoing description and in the drawings shall be interpreted as illustrative only and not as limitative of the invention.

This application is a continuation-in-part of our co-pending applications Serial No. 298,296, filed July 11, 1952, and Serial No. 301,466, filed July 29, 1952, now Patent No. 2,708,307, May 17, 1955.

We claim:

1. A split sleeve pipe repair device adapted to enclose a portion of a pipe line, comprising, in combination, two complementary arcuate segments, flange portions extending radially outwardly from the longitudinal edges of each of said segments to provide said sleeve with pairs of flange portions on radially opposite sides thereof, said pairs of flange portions being spaced apart and out of contact with each other, and each flange portion being provided with apertures adjacent its axially spaced ends and with at least one aperture between the end apertures for receiving bolt means for drawing said sleeve segments together, gasket means at each end of said sleeve segments, means for compressing said gasket means, said gasket means extending over said ends of said sleeve segments to completely seal the same, resilient compressible sealing means disposed between the complementary flange portions of the segments and extending between the gasket means at each end of the sleeve, said resilient compressible sealing means between each pair of flanges comprising an elongated strip following a continuous tortuous path between each flange pair, said path varying in distance from the longitudinal axis of the segment and merging with the gasket means at each sleeve end at a point radially-inwardly of said apertures, and said path extending radially-outwardly of each of said apertures by a distance at least as great as the radial thickness of said sealing means from a point radially inwardly of each aperture, said strip lying in said tortuous path only and the remainder of said flanges being free from contact with said strip and free from contact with each other and said strip leaving each of said bolt means free on at least one radial side.

2. In a pipe line, a pipe section having a damaged portion, a split sleeve repair device enclosing said damaged portion, said device comprising, in combination, two complementary arcuate segments, flange portions extending radially outwardly from the longitudinal edges of each of said segments to provide said sleeve with pairs of flange portions on radially opposite sides thereof, said pairs of flange portions being spaced apart and out of contact with each other, and each flange portion being provided with apertures adjacent its axially spaced ends and with at least one aperture between the end apertures for receiving bolt means for drawing said sleeve segments together, gasket means at each end of said sleeve segments, each flange portion of one of said segments being formed with a continuous tortuous groove extending between the gasket means at each end of said segment, means for compressing said gasket means, said gasket means extending over said ends of said sleeve segments to completely seal the same, resilient compressible sealing means disposed between the complementary flange portions of the segments and extending between the gasket means at each end of the sleeve, said resilient compressible sealing means between each pair of flanges comprising an elongated strip following a continuous tortuous path defined by said groove between each flange pair, said path varying in distance from the longitudinal axis of the segment and merging with the gasket means at each sleeve end at a point radially inwardly of said apertures, and said path extending radially outwardly of each of said apertures by a distance at least as great as the radial thickness of said sealing means from a point radially inwardly of each aperture, said strip lying in said tortuous path only and the remainder of said flanges being free from contact with said strip and free from contact with each other, and said strip leaving each of said bolt means free on at least one radial side.

3. A split sleeve pipe repair device adapted to enclose a portion of a pipe line, comprising, in combination, two complementary arcuate segments, flange portions extending radially outwardly from the longitudinal edges of each of said segments to provide said sleeve with pairs of flange portions on radially opposite sides thereof, said pairs of flange portions being spaced apart and out of contact with each other, and each flange portion being provided with apertures adjacent its axially spaced ends and with at least one aperture between the end apertures for receiving bolt means for drawing said sleeve segments together, gasket means at each end of said sleeve segments, means for compressing said gasket means, said gasket means extending over said ends of said sleeve segments to completely seal the same, resilient compressible sealing means disposed between the complementary flange portions of the segments and extending between the gasket means at each end of the sleeve, said resilient compressible means between each pair of flanges comprising an elongated strip of rubbery material having a durometer value lying between 50 and 85, said strip following a continuous tortuous path between each flange pair, said path varying in distance from the longitudinal axis of the segment and merging with the gasket means at each sleeve end at a point radially-inwardly of said apertures, and said path extending radially-outwardly of each of said apertures by a distance at least as great as the radial thickness of said sealing means from a point radially inwardly of each aperture, said strip lying in said tortuous path only and the remainder of said flanges being free from contact with said strip and free from contact with each other and said strip leaving each of said bolt means free on at least one radial side.

4. A split sleeve pipe repair device adapted to enclose a portion of a pipe line, comprising, in combination, two complementary arcuate segments, flange portions extending radially outwardly from the longitudinal edges of each of said segments to provide said sleeve with pairs of flange portions on radially opposite sides thereof, said pairs of flange portions being spaced apart and out of contact with each other, and each flange portion being provided with apertures adjacent its axially spaced ends and with at least one aperture between the end apertures for receiving bolt means for drawing said sleeve segments together, gasket means at each end of said sleeve segments, means for compressing said gasket means, said gasket means extending over said ends of said sleeve segments to completely seal the same, resilient compressible sealing means disposed between the complementary flange portions of the segments and extending between the gasket means at each end of the sleeve, said resilient compressible means between each pair of flanges comprising an elongated strip following a continuous tortuous path between each flange pair, said path varying in distance from the longitudinal axis of the segment and merging with the gasket means at each sleeve end at a point radially-inwardly of said apertures, and said path extending radiately-outwardly of each of said apertures by a distance at least as great as the radial thickness of said sealing means from a point radially inwardly of each aperture, said strip lying in said tortuous path only and the remainder of said flanges being free from contact with said strip and free from contact with each other and said strip leaving each of said bolt means free on at least one radial side, said strip being formed from rubbery material having a durometer value lying between 50 and 85 and the portion of said strip lying radially outwardly of said apertures having a compressive resistance which is 10 to 50% greater than the compressive resistance of the remainder of the strip.

References Cited in the file of this patent

UNITED STATES PATENTS

| | | |
|---|---|---|
| 1,051,086 | Clark | Jan. 21, 1913 |
| 1,252,888 | Dorsey | Jan. 8, 1918 |
| 1,818,985 | Burnish | Aug. 18, 1931 |
| 2,188,302 | Pfefferle | Jan. 30, 1940 |
| 2,197,450 | Curtis | Apr. 16, 1940 |
| 2,217,664 | Berger | Oct. 15, 1940 |
| 2,543,963 | Gaffin | Mar. 6, 1951 |

FOREIGN PATENTS

| | | |
|---|---|---|
| 13,347 | Great Britain | Dec. 14, 1889 |